Aug. 18, 1931.   H. D. JAMES   1,819,514
GARAGE ELEVATOR
Original Filed March 27, 1928   6 Sheets-Sheet 3
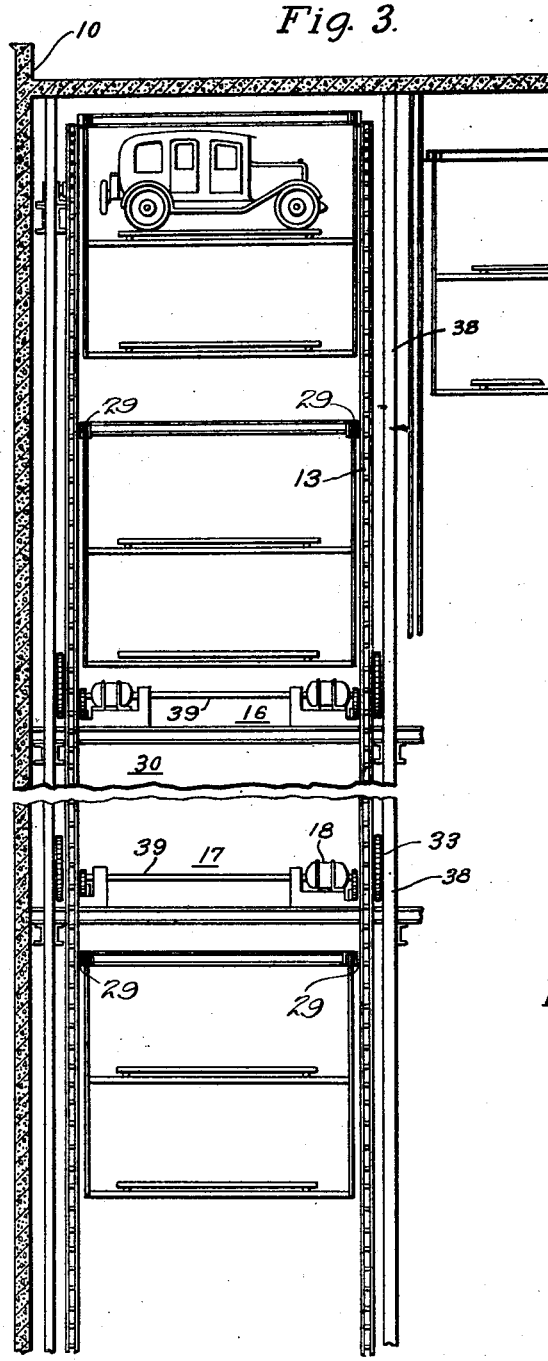
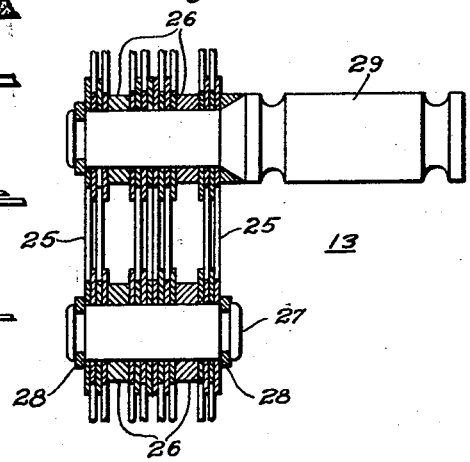
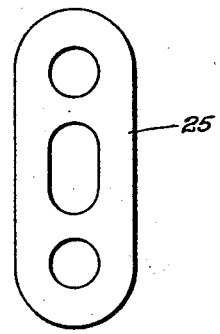
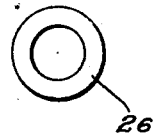
INVENTOR
Henry D. James.
BY
ATTORNEY Aug. 18, 1931.   H. D. JAMES   1,819,514
GARAGE ELEVATOR
Original Filed March 27, 1928   6 Sheets-Sheet 4
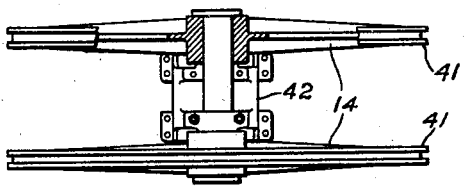
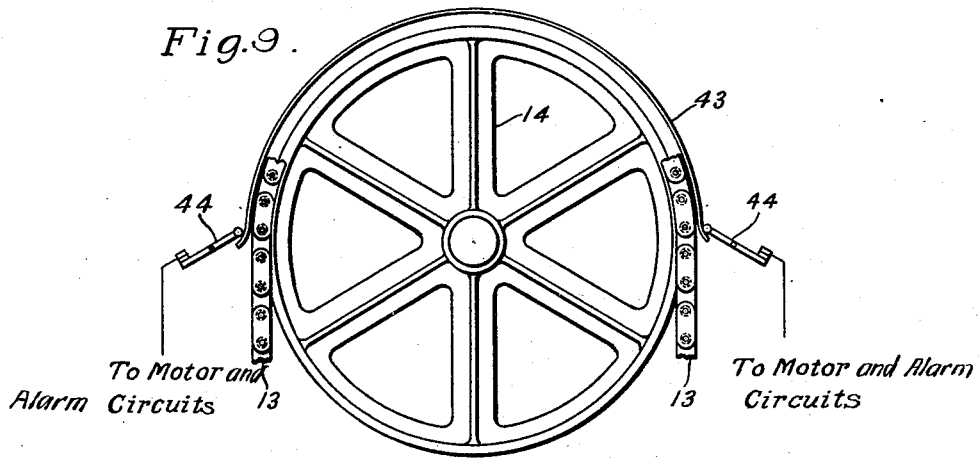
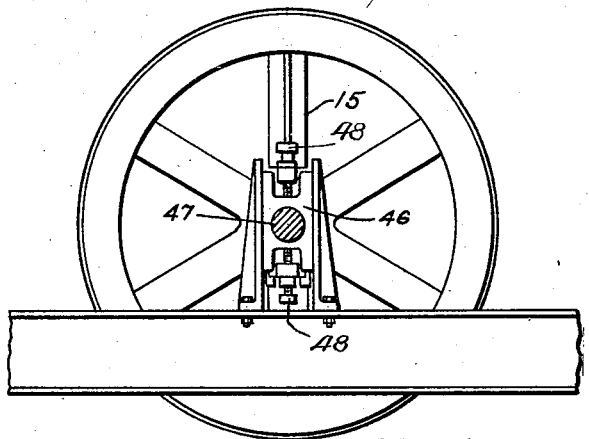
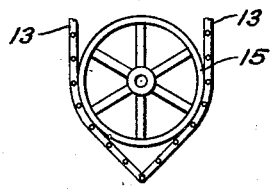
INVENTOR
*Henry D. James.*
BY
ATTORNEY

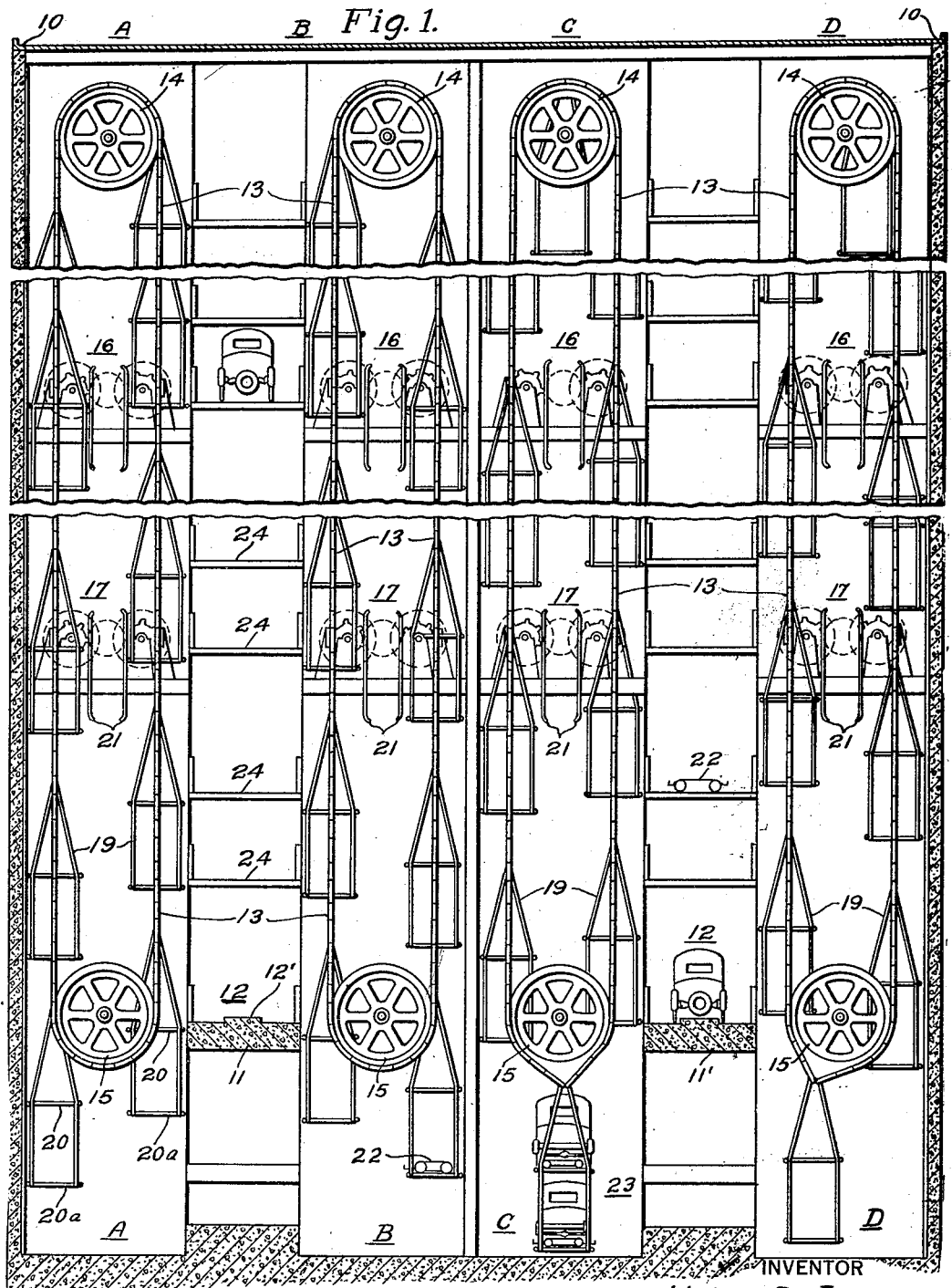

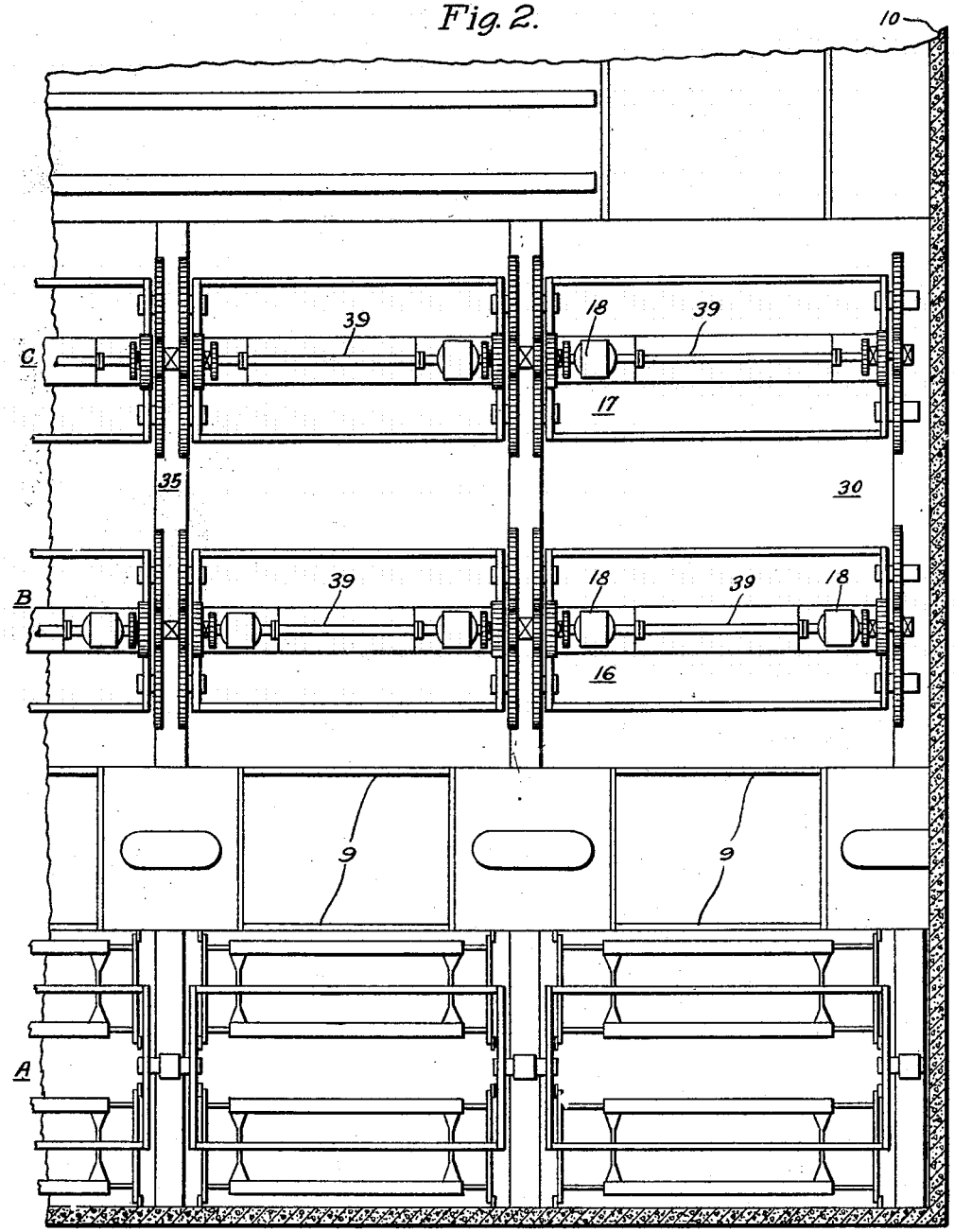

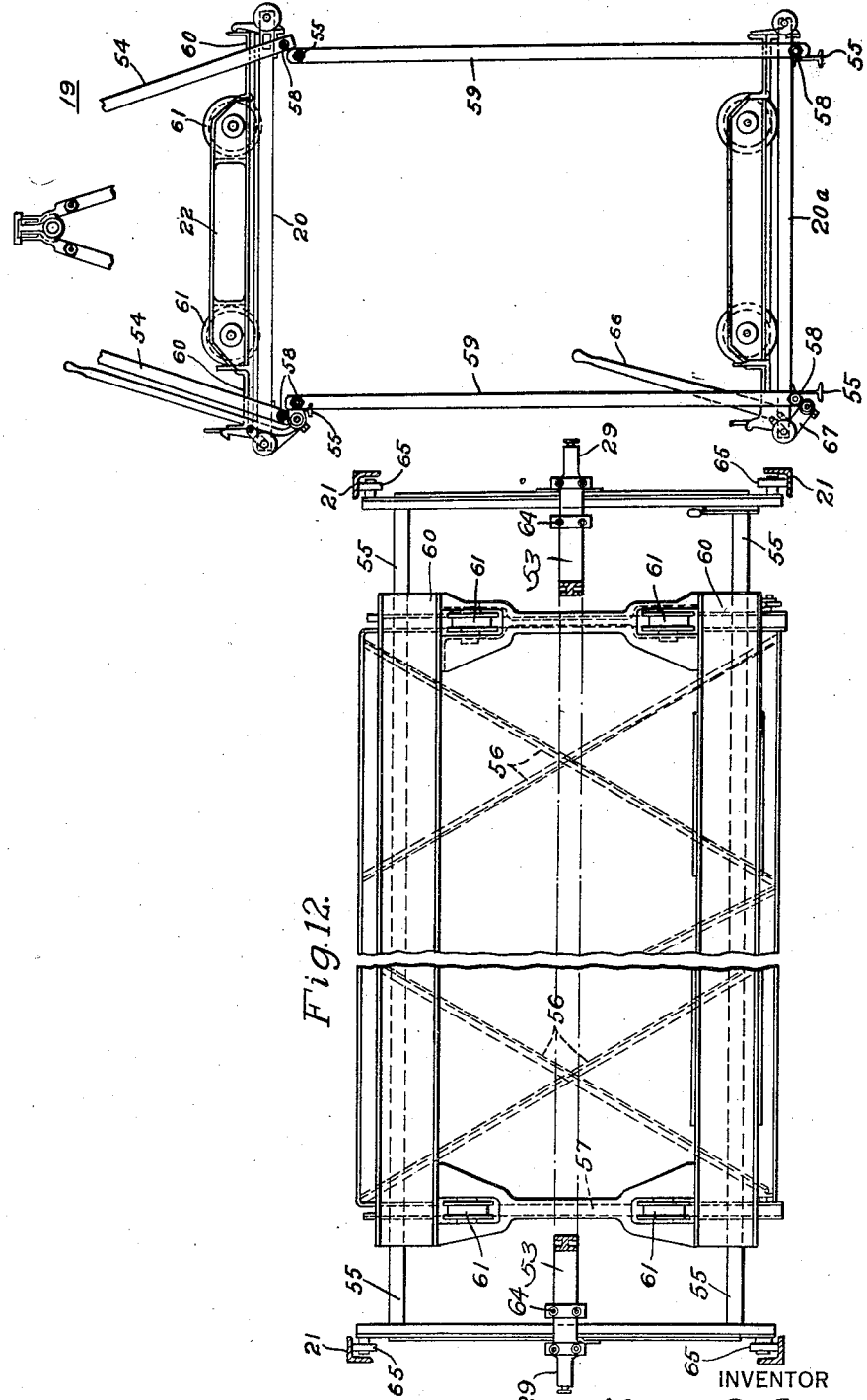

Aug. 18, 1931.   H. D. JAMES   1,819,514
GARAGE ELEVATOR
Original Filed March 27, 1928   6 Sheets-Sheet 6

INVENTOR
Henry D. James.
BY
ATTORNEY

Patented Aug. 18, 1931

1,819,514

UNITED STATES PATENT OFFICE

HENRY D. JAMES, OF EDGEWOOD, PENNSYLVANIA, ASSIGNOR TO WESTINGHOUSE ELECTRIC & MANUFACTURING COMPANY, A CORPORATION OF PENNSYLVANIA

GARAGE ELEVATOR

Original application filed March 27, 1928, Serial No. 265,011. Divided and this application filed July 25, 1929. Serial No. 380,815.

My invention relates generally to conveyor systems used particularly for storing or parking automobiles and it has particular relation to chains comprising the conveyor structure.

Various types of automobile parking and storing buildings or devices have been suggested for the purpose of alleviating conditions arising from difficulty in parking automobiles in congested business sections of large cities.

A type of automobile storing and parking building is fully described in my copending application, Serial No. 265,011, filed March 27, 1928, assigned to the Westinghouse Electric & Manufacturing Company, and of which this invention is a division.

It comprises essentially a plurality of cages or receptacles of a box-shape, for containing automobiles, disposed into two vertical columns and pivotally suspended from and between a pair of spaced-apart vertically disposed endless chains. The endless chains are supported and movable around sheaves or sprocket wheels suitably disposed at the top and bottom of a building structure and the cages are movable therewith in a circuitous or endless path successively past one or more loading stations in the building structure.

Due to the tremendous stresses to which the flexible members or chains are subjected in supporting the automobiles and the cages, the safety necessary for the commercial operation of the conveyor requires that the chains be protected against anything happening to them, which would allow the cages and the automobiles to fall.

The chain comprising my invention is mechanically constructed to guard against failure to a link member thereof, and I have provided means associated with the chains for detecting the loosening of a pin or pintle connecting the links of the chain. I have also provided means associated with the chains for detecting the displacement of the chain from their supporting sheaves or sprocket wheels.

My invention enables the particular type of conveyor described in my copending application, mentioned above, to be used without violating any safety code existing or to be adopted, since it provides a complete and adequate protection against any reasonably forseeable contingency arising from a defect in the chain or its means of support.

Therefore, it is an object of my invention to provide a driving chain with rollers, the links of which chain are so constructed that the failure of a single link does not render the chain inoperative.

Another object of my invention is to construct a supporting chain for a conveyor whereby any section of the chain may be removed while the remainder is held in position by the driving units.

Another object of my invention is to provide a means for automatically stopping the conveyor should a travelling member become displaced from its prescribed path, and preventing further movement of the conveyor until the travelling member is restored to its prescribed normal position.

Another object of my invention is to automatically effect the actuation of an alarm or signal means upon the displacement of a traveling member from its prescribed path.

It is also an object of my invention to automatically detect the loosening of a pin or pintle connecting the links of a chain, and stop the conveyor comprising the chain upon the detection of a loosened pin or pintle.

A further object of my invention is to automatically effect the operation of an alarm, such as an alarm bell whenever a pin or pintle connecting the links of a chain is loosened.

My invention will be described with reference to the accompanying drawings, wherein:

Figure 1 represents a side elevation of a building structure, in which are a plurality of conveyor systems comprising chains constructed in accordance with my invention.

Fig. 2 is a top plan view of a portion of the building, shown in Fig. 1, and indicating a difference in the driving units for the system at various elevations throughout its height.

Fig. 3 is a front elevation of a section of the building shown in Figs. 1 and 2, and showing the distinction between the driving units at different elevations throughout the height of the building.

Fig. 4 is a sectional view of a chain constructed in accordance with my invention and used for driving the system described hereinafter.

Fig. 5 is a detail plan view of a single lamination used in assembling the links of the chain shown in Fig. 4.

Fig. 6 is a detail end view of a roller used in the chain shown in Fig. 4.

Fig. 7 is a detail end view of a locking ring used in the chain shown in Fig. 4.

Fig. 8 is a top plan view showing the manner in which the upper guiding sheaves of the interior conveyors constructed in accordance with my invention are mounted on common supporting members.

Fig. 9 is a view in front elevation of a sheave for guiding the operating chain of a conveyor constructed in accordance with my invention and showing also a device for breaking the electrical circuit to the main motors upon the derailment of any section of the chain from the guiding sheave.

Fig. 10 is a view in front elevation of a sheave for guiding the operating chain at the lower extremity of a conveyor constructed in accordance with my invention.

Fig. 11 is a diagrammatic view showing the resolution of forces in the chain when a load is supported beneath the center of the lower guiding sheave.

Fig. 12 is a top plan view of a sling, pendantly mounted on the driving chain.

Fig. 13 is an end view of the sling showing the arrangement for supporting a plurality of platforms on the same sling.

Figure 14:
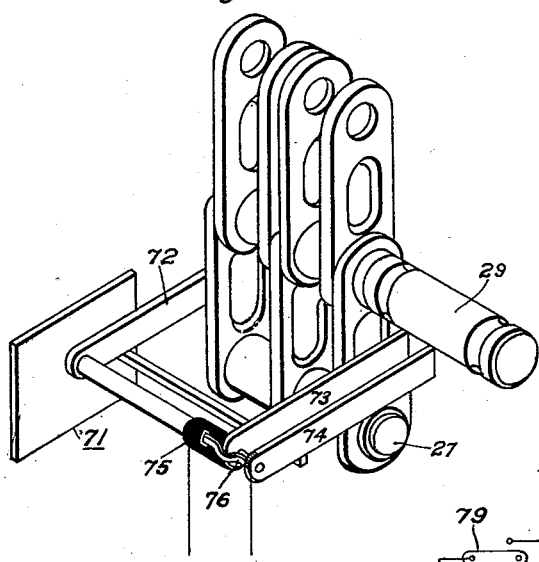
Fig. 14 is a perspective view of a device for detecting the displacement of a chain pin and upon such detection, to break the motor circuit and effect the operation of an alarm.

Referring now to Figs. 1, 2 and 3, a building 10 is shown in which a number of rows of conveyor systems A, B, C and D are installed and disposed to receive automobiles at the ground floor 11 of the building.

A passageway or driveway as 12 is provided between each pair of conveyor rows and in this way automobiles are supplied to the conveyors on either side of the driveway 12, that is to say, automobiles entering the driveway 12 may be loaded on either the conveyors in the row A, or the row B, whichever is most convenient. A guide 12' may be formed on the floor of the passage to guide automobiles in their passage through the passageway 12.

It will be observed that each of the conveyors constitutes a pair of parallel vertical columns inter-communicating at the uppermost and lowermost ends of the columns. The automobiles or other loads to be placed upon each of the conveyors is thus arranged for circuitous passage upwardly in one column and downwardly in the other column of the pair. Each of the conveyors constitutes an endless chain conveyor element 13 extending vertically in the pair of columns and carries a plurality of load supporting elements or slings 19 upon which are mounted load receptacles or platforms 20 adapted to receive automobiles or other loads placed upon the system.

The several conveyors constituting row A are all so arranged along the passageway 12 that one column of each of the conveyors is adjacent to or faces the passageway 12. In like manner, one column of each of the conveyors constituting row B is adjacent the passageway 12, while one column of each of the conveyors constituting rows C and D is adjacent opposite sides, respectively, of passageway 11'. It will also be observed that in order to make use of the greatest amount of space within the building structure 10, those columns of the conveyors in rows B and C spaced from driveways 11 and 12 are closely adjacent each other, space being left between these adjacent columns only sufficient to ensure safe passage of the load receptacles in the columns past each other.

The chains are guided in their transposition from one of the columns to the other by means of guide sheaves 14 and 15, respectively, located at the upper and lower ends of the columns. The power for driving the chain is transmitted from motors located at 16 and 17 geared directly to the chain 13 and the distances between the lower guiding sheave 15, the driving unit 17, the driving unit 16 and the upper sheave 14 are substantially equal. It will be understood, however, that additional driving units may be installed between the unit 16 and the unit 17 with an additional length of chain so that the conveyor system may be extended vertically without overloading the driving equipments.

The driving unit 16 supports the weight suspended by that section of the chain between the driving unit 16 and the driving unit 17, as well as that unbalanced portion of load suspended between the driving unit 16 and the upper sheave 14.

The load on the driving unit 17 is that weight supported between the driving unit 17 and the lower sheave 15 so that at no time will the load on a driving unit, with the exception of the upper driving unit, exceed the maximum load which can be suspended between a driving unit and the next adjacent driving unit. However, in the case of the upper driving unit as 16, the maximum load will be, in addition to a load equivalent to that supported by the other driving units, the unbalanced load supported between the upper driving unit 16 and the sheave 14. If, however, the loads supported between the driving unit 16 and the sheave 14 are equally balanced across the chain, the driving unit 16 will support no more load than the other driving units in the system. For this reason, it is necessary to make the upper driving unit 16 of the conveyor system of double capacity to that allowed in the other driving units as 17 of the system.

A top plan view of the driving unit 16 is shown in row B of Fig. 2 and a similar view of the driving unit 17 is shown in row C of Fig. 2. It will be noted from these figures that the upper driving unit 16 comprises two motors 18, whereas the lower or intermediate driving units comprise but one motor.

Since there may be any number of driving means similar to that of 17 located between the unit 17 and the unit 16, a broken space has been left in the Fig. 1, to indicate that it is possible to install additional driving units as 17, with a corresponding section of conveyor system.

Since each driving unit supports that portion of the conveyor system which lies between that driving unit and the next adjacent driving unit, additional driving units with their corresponding section of chain may be installed without increasing the operating tension in the chain or overloading any driving unit.

It will be observed that the attachment of the slings to the chain 13, as will hereinafter be described, provides a pendant support for the automobiles, which will permit the automobiles to be translated throughout the circuit while remaining at all times in a horizontal position. However, such pendant supporting of the automobiles and the supporting platforms permits swinging or swaying of the platforms during the passage through the conveyor system, and hence, I find it desirable to guide these platforms as they pass the driving units or other obstructions which may be occupying the space between adjacent columns of the conveyor system. I have illustrated at 21 such guiding members as being mounted adjacent each of the driving units 16 and 17, and it is to be understood that one of these guiding members 21 will be provided for each driving unit or other obstruction. It will, therefore, be seen that while I have avoided the use of a continuous guiding member, I have provided for the safe passage of the platforms past all dangerous points in the conveyor system.

Referring now to Figs. 4, 5, 6 and 7, detailed views of the chain 13 are shown. Fig. 4 shows the assembly of a plurality of laminations 25 which are divided into three groups, each group being separated from the other by a roller 26. Since a number of the laminations 25 are required to complete one link of the chain 13, if at any time one of the laminations 25 fails, the chain will not be rendered inoperative on this account, nor will any lamination be greatly overloaded due to such failure of another. A pin 27 is provided to fasten together the laminations of one link and the next adjacent link, as well as to retain the roller 26 in its position between the groups of laminations. A locking ring 28 is clamped about a groove in each end of the pin 27 and retains the laminations in their proper position on the pin 27. A number of pins having projections as 29, are provided throughout a conveyor and on these projections 29, one side of a sling is mounted. The details of such construction will be described hereinafter.

It will be observed that the links 25 of the chain 13 are divided by the rollers 26 into a plurality of groups. The driving sprockets as described in detail in my copending application, Serial No. 265,011, mentioned above, are suitably arranged to drive directly upon the chain 25 by engagement of their teeth with the rollers 26. Therefore the chain, having its links made up of a plurality of groups of laminations, provides a plurality of points at which lifting power may be applied to the chain 13 rather than having all of the power applied at a single point. The advantage of this is at once apparent, since the lifting or driving strain is distributed throughout the length of the connecting pin 27 instead of being applied at a single point in the length of this pin to thereby cause a very undesirable bending stress upon the pin 27. Moreover, the use of rollers 26 provides an enlarged contact area for engagement by the teeth of the sprockets 31, thus reducing the wear upon these parts.

Referring now to Figs. 1 and 2, the driving units 16 and 17 comprising sprockets wheels, which are motor driven through a gear train, engage the endless chains 13 at intervals throughout the height of the building and effect the movement thereof and the cages suspended therefrom in a circuitous path. These driving units are described in detail in my copending application, mentioned above.

As has previously been set forth, the uppermost motive means or motor driving device 16 for each of the conveyor systems is provided with sufficient power to substantially equal twice the driving power of the lower driving devices 17, and this provision permits the use of a guiding device at the top and bottom of the conveyor system, as distinguished from a driving device at these points. Since no power is to be applied at the top and bottom of the system, each of the endless chains 13 may be guided at its upper extremity by a toothless sheave 14, as shown in Fig. 9, on which a pair of rails or flanges 41, shown in Fig. 8, are provided to engage the chain rollers and prevent the chain from being displaced from its prescribed path. At interior sections of the building, as at 38 in Fig. 3, the sheaves 14 for this conveyor system, are mounted on a common pedestal 42 and supported by a common building structural member.

A shield 43 is provided around the upper half of the sheave 14, which will come into contact with the chain 13 should the chain ride up over the rails 41 of the sheave 40. The shield 43 is so placed that a pressure will be exerted upon it by the chain 13 when it is derailed from the sheave 40 and when such pressure is exerted upon the shield 43, an electrical circuit-interrupting device 44 is actuated to interrupt the supply of power to the motors 18 in that conveyor system and effect the actuation of an alarm or signal means such as an alarm bell 102. (See Figs. 9 and 15). Such a circuit-interrupting device may be installed in the motor control circuits shown in Fig. 15, which shows a control scheme for the conveyor and the operation of such a circuit interrupting device will be readily understood from the description set forth hereinafter.

A sheave 15, shown in Fig. 10, is provided for guiding the driving chains 13 at the lower extremity of the conveyor and an adjusting device 46 associated with it so that the tension in the chain may be varied as desired. To accomplish this, sheave 15 is supported on a shaft 47 vertically adjustable by means of screws 48.

Fig. 11 shows diagrammatically a load suspended beneath the center of the lower sheave 45 and it is seen from this diagram that the weight of the suspended load must be resolved into vertical components and a corresponding vertical force exerted by the chain 13. If the chain 13 is fitted snugly about the sheave 15 so that the chain beneath the center of the sheave 15 lies in practically a horizontal plane when a load is supported at that point, the forces exerted by the chain on the supported load will be for the greater part in a horizontal direction and in this way, bending stresses will be set up in the chain which will be injurious to the links. It is, therefore, desirable that sufficient slack be left in the chain at this point so that the weight of the suspended load may resolve itself into forces whose components are as nearly vertical as is economically possible. For this reason, the adjusting mechanism 46 has been provided for the lower sheaves 15. The sheaves 15 are mounted on a stationary shaft 47 and adjusting screws 48 are provided to permit vertical adjustment of the shaft 47 and in that way provide for adjustment of the sheave 15.

The structure of the slings 19 is shown in Figs. 12 and 13, and it will be seen that the sling comprises a skeleton structure which is light in weight and may be readily disassembled or removed from the chain 13 without interfering with the operation of the remaining slings. Two projecting pins 29 on parallel chains 13 are shown rigidly connected to each other by a beam 53. The sling structure is then suspended from the beam 53 and is pendant about the chain pins 29 as an axis. At each end of the beam 53 a pair of supporting straps 54 extend downward to support the upper platform 20 of the sling. The platform structure comprises a pair of beams 55 suspended at either end of the sling by the supporting straps 54. The beams 55 are connected together by a skeleton bracework 56 and a track-way 57 is laid laterally across the beams 55 on which a low truck 22, for moving an automobile laterally into a sling from the driveways 24 and out of a sling into the driveways, is disposed for operation. The details of construction and mode of operation of the truck 22 are described and explained in detail in my above mentioned copending application.

The connection between the supporting straps 54 and the I-beams 55 is shown in Fig. 13 and comprises a bolt 58, spot-welded into the corner of the I-beam 55 and connected to the supporting strap 54. A similar connection is provided for the supporting strap 59 which supports the lower platform 20a of the sling 19. Thus the structure of the sling may be completely disassembled by the removal of the nuts from the bolts 58 and the removal of the suspending members and platforms individually.

The main cross beam 53 is mounted on the projecting pins 29 of the chain 13 at each end by a pair of U-bolts 64, so that when it is desired to remove the sling from the chain, the U-bolts may be removed which allows the cross beam 53 to be removed from the chain pins 29, leaving the pins in the chain so that further operation of the conveyor system is not interfered with by the removal of one sling.

In a chain constructed as described above, it will be easily possible for the connecting pins 27 to become loosened and slip out of their proper position and a device is provided which automatically stops the conveyor, and effects the actuation of an alarm means such as an alarm bell 103 before a loosened pin may become entirely removed from the links which it joins together. A mechanism 71 is provided which comprises the three levers 72, 73 and 74, the levers 72 and 73 being mounted on a common shaft and the lever 74 being mounted on a shaft concentric with that of the levers 72 and 73. Thus, in case the pin 27 becomes loosened and starts to move outwardly, either the lever 72 or 73, dependent upon the direction the pin moves, will be caught by the pin and actuated to interrupt the power supply to the motor through the operation of the contact members 75 and 76.

The contact member 76 is mounted on the lever 74 and is movable with the lever 74. The contact member 75 is surrounded by insulating material and mounted on the shaft common to the members 72 and 73. When in their normal position the contact member 75 is in engagement with the contact member 76 and an electrical circuit is completed between them but when either lever 72 or lever 73 is actuated, and the lever 74 remains stationary, the electrical connection between the contact members 75 and 76 is broken and the supply of power to the driving motors interrupted. A number of such devices may be provided with each conveyor, so that no pin can move an excessive distance before actuating one of the levers. The electrical connections may be made in series with the device 44 described above and connected into the circuits shown in Fig. 15 as described below.

Since it is impossible for the projecting pins 29 to move from their prescribed positions in the chains, they being rigidly held together by the cross beam 53, the lever 74 is provided so that the supply of power to the motor will not be interrupted by the safety device 71 when such a projecting pin 29 actuates the safety device 71. When the projecting pin 29 comes into contact with the levers of the safety device 71, both the levers 73 and 74 will be moved together and since there will be no relative motion between these two levers, there will be no relative motion between the contact members 75 and 76 and the electrical circuit between the contact members will not be interrupted.

Figure 15:
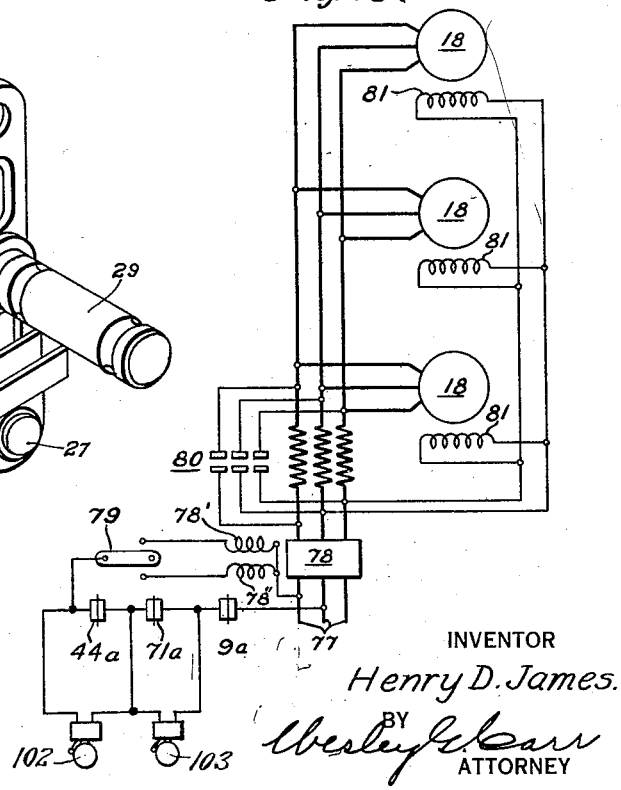
Fig 15 is a schematic diagram showing a method of controlling the operating motors in my conveyor system and applying their brakes simultaneously.

A typical control scheme for the conveyor system is shown diagrammatically in Fig. 15 and provides for operating all the motors 18 in parallel as well as applying the brakes automatically upon interruption of the supply of power to the motors 18. The motors 18 are disposed to be connected to the supply line 77 through the main switch 78. The main switch 78 is of any type well known in the art which provides for reversing the connection to the motors 18, but is preferably of the magnetically operated type having cooperating coils 78′ and 78″, one of which corresponds to each direction of rotation in the motor. The main switch 78 is operated to the desired position by actuation of the control switch 79 to complete an energizing circuit through the desired operating coil 78′ or 78″. A starting device 80 is provided in accordance with the accepted practice for applying a reduced voltage to the motors upon starting, the starting device 80 may be of any conventional type. The contact members 9a, 44a and 71a are inserted in the control switch circuit and are respectively operated by the gate 9, the safety switch 44 and the safety switch 71, each of which has been described hereinbefore. When any of the contact members 9a, 44a or 71a is in an open position, the control circuit for the main switch 78 cannot be energized to maintain the switch 78 closed and therefore motors 18 cannot be operated until the open contact members are restored to their closed position.

The contact members 44a normally shunt the alarm bell 102 and thus it is prevented from ringing since an insufficient amount of current passes through it, as long as contact members 44a remain closed. When a chain is displaced from a sheave, the resultant opening of contact members 44a permits a sufficient amount of current to pass through the bell 102 to ring it and give an alarm. Although the circuit through either of the main switch coils 78′ and 78″ is maintained, the resistance of the bell 102 is sufficient to effect such a reduction of the current as to cause the switch 78 to open and stop the motors 18.

In a similar manner an alarm bell 103 is normally shunted by contact members 71a and operates in the same way upon the opening of contact members 71a caused by the loosening or displacement of a chain pin from its normal position.

Each of the motors 18 is provided with a magnetically released braking mechanism with an operating coil 81. When the coil 81 is deenergized, the braking mechanism is held by the action of a spring such as braking mechanism commonly used in elevator installations. When the main switch 78 is operated to complete a circuit to the motor windings, a circuit is also completed which energizes the brake releasing coils 81, but upon interruption of the motor circuits, the coil 81 is deenergized and the brake applied to the spring.

Therefore, it will be seen that I have provided a chain for a conveyor, which is mechanically constructed to guard against failure of a link member. It will also be seen that I have provided a chain having a means for automatically detecting the loosening of a pin or pintle thereof, whereby the conveyor comprising the chain is stopped and an alarm given upon the detection of the defect. It will further be seen, that I have provided a chain having a means for detecting the displacement of the chain from its prescribed normal path, and whereby the movement of the conveyor comprising the chain is stopped and an alarm given and further movement of the chain prevented until the chain is returned to its normal position or path.

Since it will be possible to modify the embodiment set forth and adapt it or parts thereof, to various applications without departing from the spirit and scope of the invention, it is desired that the description hereinbefore set forth be construed as entirely illustrative and not in a limiting sense.

I claim as my invention:

1. In a conveyor system, a chain for driving the conveyor, said chain comprising a plurality of links, a plurality of pins for interconnecting the links, and means operable by the projection of a pin beyond its prescribed position for attracting attention thereto.

2. In a chain, a plurality of interconnected links, pins for uniting the links, said links being composed of a plurality of groups of laminations whereby upon the failure of one lamination the chain may continue in operation without excessively overloading the remainder of the laminations, a plurality of said pins being provided with a projecting portion extending beyond the chain, said projecting portions disposed to support load receptacles on said chain, alarm means for indicating displacement of the pins of said chain including an alarm, a pair of members stationarily disposed adjacent said chain between which said chain may move, engageable by pins displaced on either side of said chains for actuating said alarm, means engageable by load receptacle supporting pins for rendering said alarm actuating means ineffective during the passage of said last-named pins past said actuating means.

3. In a chain, a plurality of interconnected links, pins for uniting the links, said links being composed of a plurality of groups of laminations whereby upon the failure of one lamination the chain may continue in operation without excessively overloading the remainder of the laminations, a plurality of said pins being provided with a projecting portion extending beyond the chain, said projecting portions disposed to support load receptacles on said chain, motive means for said chain, a pair of members stationarily disposed adjacent said chain between which said chain may move, engageable by pins displaced on either side of said chain, and means operable by engagement of either of said members and said pin for stopping said motive means.

4. In a conveyor system, a chain comprising links, a plurality of pins for connecting said links, and means responsive to the displacement of a pin from its normal position for attracting attention thereto.

5. In a conveyor system, a chain comprising links, a plurality of pins for connecting said links, an alarm, and means responsive to the displacement of a pin from its normal position for actuating said alarm.

6. In a conveyor system, a chain, motive means for moving said chain, said chain comprising links, a plurality of pins for connecting said links, and means responsive to the displacement of a pin from its normal position for stopping said motive means and rendering it ineffective to move said chain.

In testimony whereof, I have hereunto subscribed my name this 10th day of July, 1929.

HENRY D. JAMES.